United States Patent
Hofer et al.

(10) Patent No.: US 10,255,909 B2
(45) Date of Patent: Apr. 9, 2019

(54) STATISTICAL-ANALYSIS-BASED RESET OF RECURRENT NEURAL NETWORKS FOR AUTOMATIC SPEECH RECOGNITION

(71) Applicant: INTEL IP CORPORATION, Santa Clara, CA (US)

(72) Inventors: Joachim Hofer, Munich (DE); Josef G. Bauer, Munich (DE); Piotr Rozen, Gdansk (PL); Georg Stemmer, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/637,559

(22) Filed: Jun. 29, 2017

(65) Prior Publication Data

US 2019/0005945 A1 Jan. 3, 2019

(51) Int. Cl.
*G10L 15/16* (2006.01)
*G10L 15/14* (2006.01)
*G10L 25/30* (2013.01)
*G10L 15/26* (2006.01)

(52) U.S. Cl.
CPC .............. *G10L 15/16* (2013.01); *G10L 15/14* (2013.01); *G10L 15/26* (2013.01); *G10L 25/30* (2013.01)

(58) Field of Classification Search
CPC ...................................................... G10L 15/16
USPC ........................................................ 704/232
See application file for complete search history.

(56) References Cited

U.S. PATENT DOCUMENTS

| | | | |
|---|---|---|---|
| 5,481,644 A | 1/1996 | Inazumi | |
| 8,099,181 B2 * | 1/2012 | Sterzing | G05B 17/02 700/47 |
| 2018/0247643 A1 * | 8/2018 | Battenberg | G10L 15/02 |

FOREIGN PATENT DOCUMENTS

| | | |
|---|---|---|
| JP | 2654917 A | 9/1997 |
| JP | 2002358094 A | 12/2002 |
| JP | 3775423 B2 | 5/2006 |
| KR | 100322202 B1 | 4/2001 |

OTHER PUBLICATIONS

International Search Report and Written Opinion received for PCT Application No. PCT/US2018033600. dated Sep. 21, 2018. 9 pages.

\* cited by examiner

*Primary Examiner* — Susan I McFadden
(74) *Attorney, Agent, or Firm* — Finch & Maloney PLLC

(57) ABSTRACT

Techniques are provided for calculating reset parameters for recurrent neural networks (RNN). A methodology implementing the techniques according to an embodiment includes generating a sequence of statistics. The calculation of each statistic is based on outputs of an RNN that is periodically re-initialized at a selected RNN reset time such that each of the calculated statistics is associated with a unique RNN reset time selected from a pre-determined range of reset times. The method further includes analyzing the sequence to identify a maximum interval during which the sequence remains relatively constant. The method further includes selecting a reset time parameter and reset context duration parameter, for re-initialization of the RNN during operation. The reset time parameter is based on the duration of the identified maximum interval and the reset context duration parameter is based on a time associated with the starting point of the identified maximum interval.

24 Claims, 6 Drawing Sheets
(1 of 6 Drawing Sheet(s) Filed in Color)

STATISTICAL-ANALYSIS-BASED RESET OF RECURRENT NEURAL NETWORKS FOR AUTOMATIC SPEECH RECOGNITION

BACKGROUND

Automatic speech recognition (ASR) systems often utilize recurrent neural networks (RNNs) as acoustic models to provide word hypothesis scores. These RNNs can become unstable, however, after executing for some period of time, resulting in a decrease in recognition accuracy. This instability may be associated with certain network training methodologies or may be due to other inherent numerical instabilities of the neural network. Existing systems generally handle this problem by periodically resetting or re-initializing the RNN after a pre-defined execution time interval. This solution, however, is not optimal since recognition accuracy will decrease if the chosen time interval is too long, and computational efficiency will be impacted if the interval is too short. Existing systems also generally use a pre-defined quantity of training data to perform the reset, which may not necessarily be sufficient to provide adequate context for the network to properly re-initialize, or may be too large resulting in slower resets.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Figure 1:
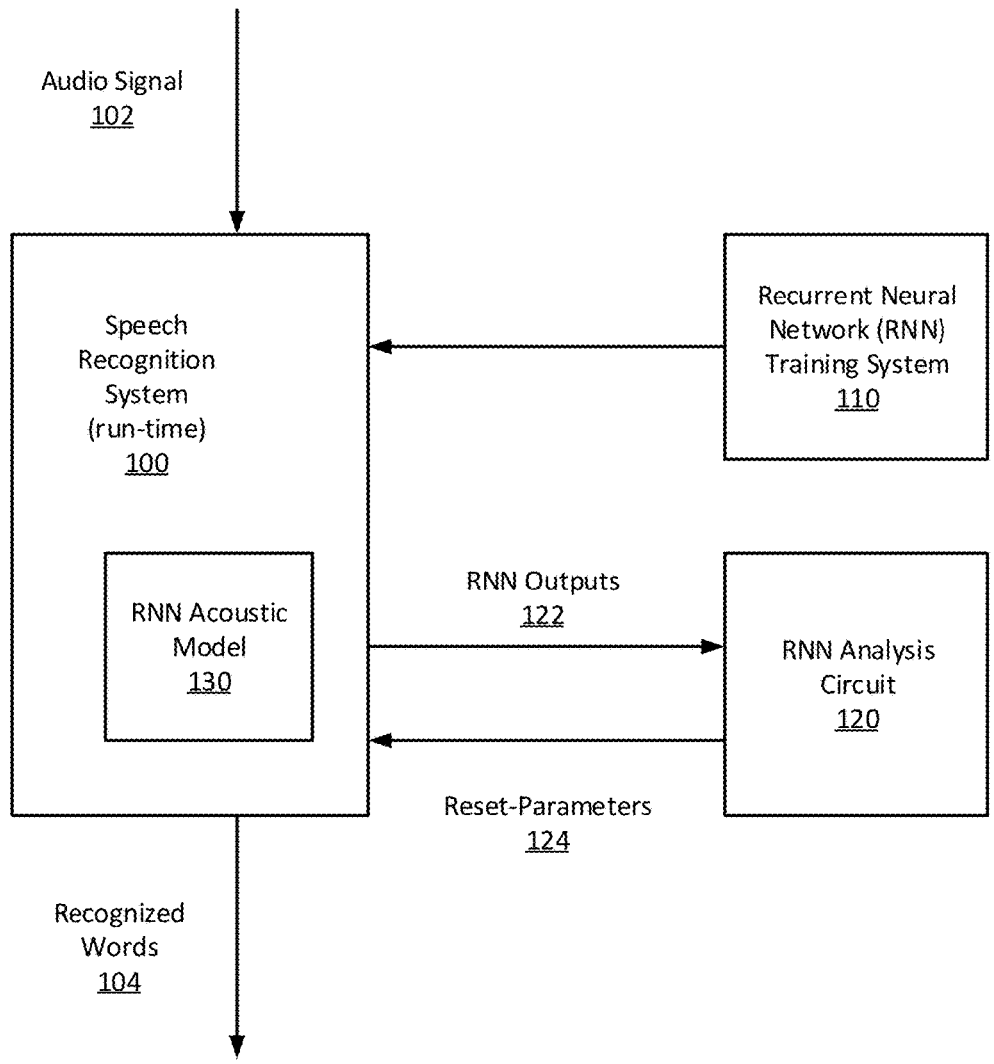
FIG. 1 is a top-level block diagram of a speech recognition system with analysis-based RNN reset parameter determination, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for analysis-based calculation of reset parameters to control the re-initialization of recurrent neural networks (RNNs). These re-initializations or resets improve the stability and performance of the RNN which is employed to provide acoustic modeling for automatic speech recognition (ASR) systems. The reset parameter calculation is based on a statistical analysis of the performance of a trained RNN over a selected range of reset parameters, as will be explained in greater detail below. In some embodiments, the reset parameters include the time between resets and the quantity of contextual training data to be supplied to the RNN for the re-initialization. The disclosed techniques can provide reset parameters that are relatively optimized for different RNN acoustic models which may vary, for example, based on training (e.g., different noise or reverberation environments) or model size (e.g., suitable for embedded devices and mobile platforms, up through large server systems).

The disclosed techniques can be implemented, for example, in a computing system or a software product executable or otherwise controllable by such systems, although other embodiments will be apparent. The system or product is configured to perform statistical-analysis-based determination of reset parameters for an RNN that serves as an acoustic model for an ASR. In accordance with an embodiment, a methodology to implement these techniques includes generating a sequence of statistics. The calculation of each statistic is based on outputs of an RNN that is periodically re-initialized at a selected RNN reset time such that each of the calculated statistics is associated with a unique RNN reset time selected from a pre-determined range of reset times. In some embodiments, the statistic is an average of the standard deviations of the outputs of the RNN. The method further includes analyzing the sequence to identify a maximum interval during which the sequence remains relatively constant. The method further includes selecting a reset time parameter and reset context duration parameter, for re-initialization of the RNN during operation. The reset time parameter is based on the duration of the identified maximum interval and the reset context duration parameter is based on a time associated with the starting point of the identified maximum interval.

As will be appreciated, the techniques described herein may allow for improved RNN re-initialization, particularly for varying acoustic models, compared to existing methods that use pre-determined reset parameters in a one-size-fits-all approach. The disclosed techniques can be implemented on a broad range of platforms including laptops, tablets, smart phones, workstations, and embedded systems or devices. These techniques may further be implemented in hardware or software or a combination thereof.

FIG. 1 is a top-level block diagram of a speech recognition system with analysis-based RNN reset parameter determination, configured in accordance with certain embodiments of the present disclosure. The speech recognition system 100 is shown to generate recognized words 104 based on a received audio signal 102 (or other suitable source of audio data) containing speech to be recognized. The speech recognition system 100 employs a recursive neural network (RNN) 130 as an acoustic model. RNN training system 110 is configured to train the RNN 130 using known techniques in light of the present disclosure. RNN analysis circuit 120 is configured to perform statistical analysis on the outputs 122 of the RNN 130 to determine relatively optimal reset parameters 124 for a given acoustic model, as will be explained in greater detail below.

Figure 2:
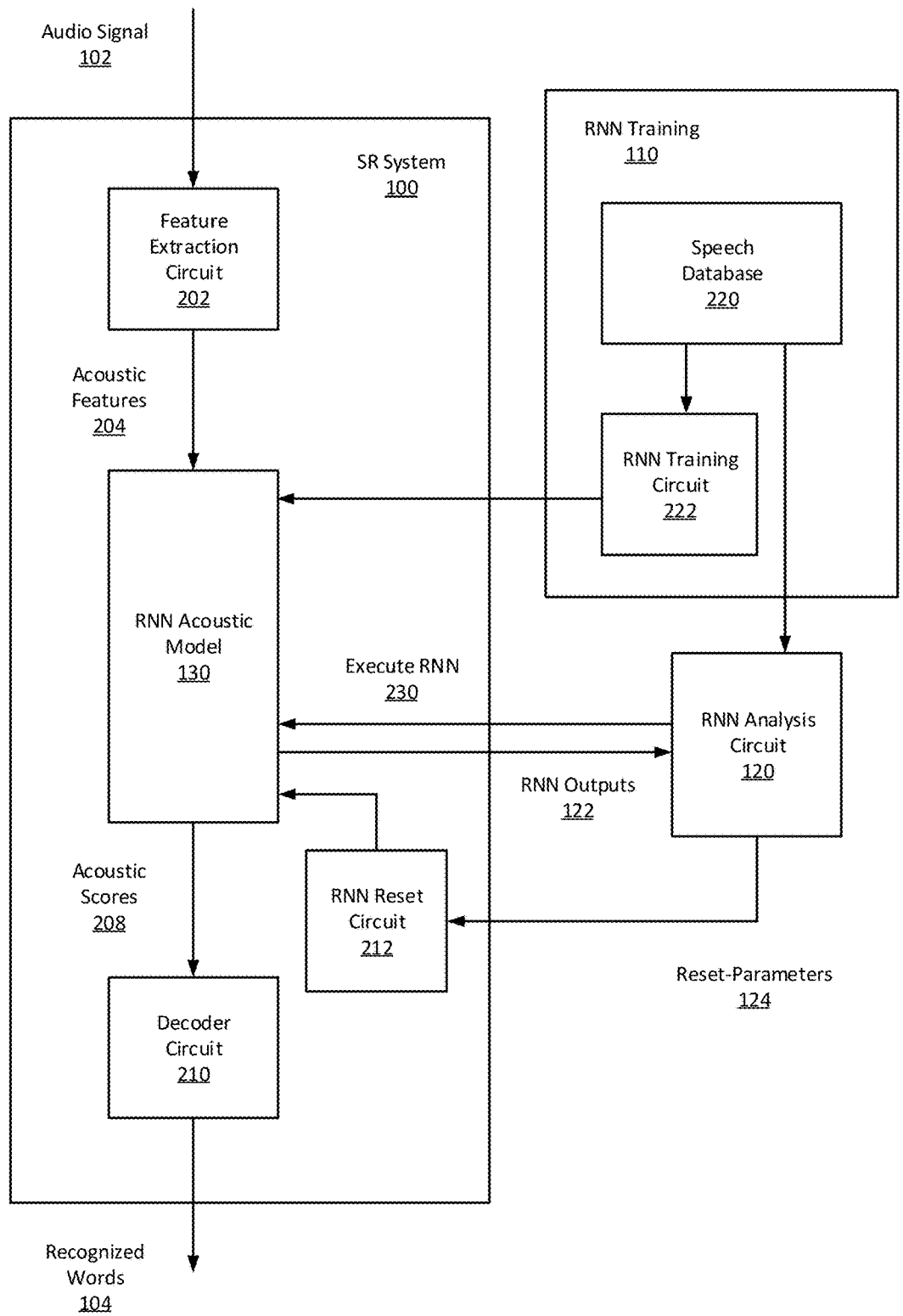
FIG. 2 is a more detailed block diagram of the speech recognition system with analysis-based RNN reset parameter determination, configured in accordance with certain embodiments of the present disclosure.

FIG. 2 is a more detailed block diagram of the speech recognition system with analysis-based RNN reset parameter determination, configured in accordance with certain embodiments of the present disclosure. The speaker recognition system 100 is shown to include a feature extraction circuit 202, the RNN acoustic model 130, a decoder circuit 210, and an RNN reset circuit 212. The RNN training system 110 is also shown to include a speech database 220 and a training circuit 222. The RNN analysis circuit 120 is also shown and will be described in greater detail in connection with FIG. 3 below.

The feature extraction circuit 202 is configured to process the audio signal 102 to generate acoustic feature vectors 204. In some embodiments, the audio signal may be provided as a series of audio data frames or windows. The audio signal can be supplied, for example, from a microphone or a storage device.

The RNN acoustic model 130 is configured to convert the acoustic features 204 into acoustic scores 208 associated with phonemes or other phonetic units, using known techniques in light of the present disclosure. For example, in some embodiments the RNN may implement a long short-term memory (LSTM) architecture.

The decoder circuit 210 is configured to determine the most likely hypothesis for the spoken words in the audio signal, using known techniques in light of the present disclosure. For example, in some embodiments the decoder may implement a weighted finite-state transducer (WFTST) model. The most likely hypothesis indicates the words that have been recognized 104.

The RNN reset circuit 212 is configured to periodically reset the RNN based on reset parameters 124 provided by the RNN analysis circuit 120. RNNs typically need to be reset or re-initialized after operating for some period of time to prevent the RNN form becoming unstable. After resetting the network, some number of frames worth of acoustic feature vectors (e.g., context data) need to be fed back to the network to initialize the network memory. The reset parameters 124 specify the time duration between resets (also referred to as the "reset time" or "chunk length") and the quantity of context data to be provided to the RNN after the reset (also referred to as the "reset context duration" or "extra left context").

The RNN training circuit 222 is configured to perform the initial training of the RNN 130, using known techniques in light of the present disclosure. The RNN can be trained using training data provided by a speech database 220 or another suitable source. The training process and training data are selected to train the RNN 130 to function as an acoustic model of some particular desired type (e.g., to handle specific noise characteristics, meet size requirements, etc.).

Figure 3:
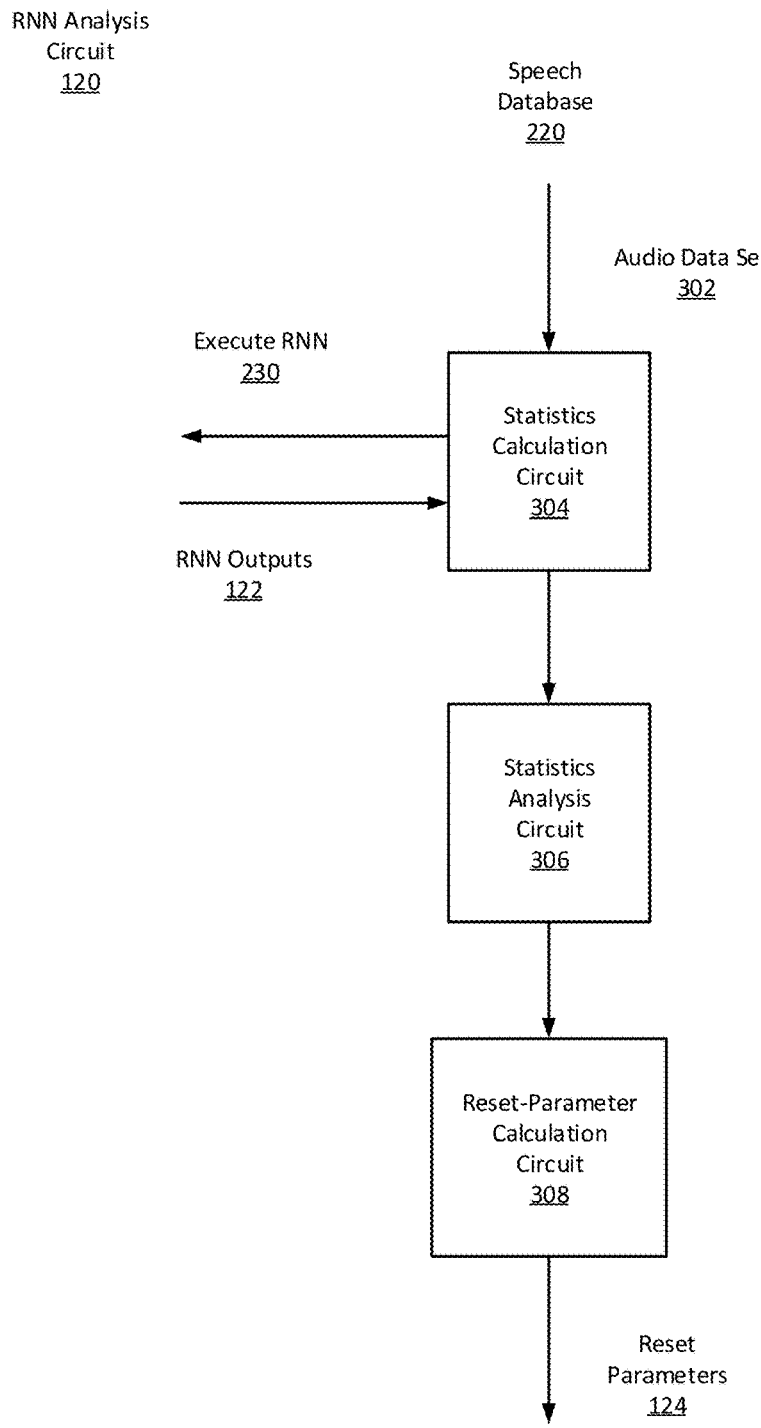
FIG. 3 is a more detailed block diagram of the RNN analysis circuit, configured in accordance with certain embodiments of the present disclosure.

FIG. 3 is a more detailed block diagram of the RNN analysis circuit 120, configured in accordance with certain embodiments of the present disclosure. The RNN analysis circuit 120 is shown to include a statistics calculation circuit 304, a statistics analysis circuit 306, and a reset-parameter calculation circuit 308. At a high level, the RNN analysis circuit 120 is configured to analyze the operation of the RNN as it executes 230 after having been trained to function as a particular type of acoustic model. The analysis is performed using a number of different chunk lengths for the RNN execution, while holding the extra left context at zero. A statistical distribution of the outputs of the RNN is calculated for each chunk length, and those statistics are used to determine the reset parameters tailored to that particular, trained RNN acoustic model. For the purposes of the analysis, the RNN execution 230 may use training data from the speech database 220.

The statistics calculation circuit 304 is configured to calculate a statistic based on outputs of an RNN which is periodically re-initialized at a selected RNN reset time (e.g., chunk length). The calculated statistic is thus associated with that selected RNN reset time. In some embodiments, the statistic is calculated as an average of the standard deviations of each of the outputs 122 of the RNN while operating under the selected reset time conditions.

This statistic calculation process is repeated for additional reset times that are selected from a range of reset times considered to be plausibly acceptable, according to some suitable criteria. A statistical sequence is then generated which comprises each of the individual statistics arranged in an order, for example, corresponding to increasing reset times (as illustrated in FIG. 4, described below).

The statistics analysis circuit 306 is configured to analyze the generated sequence to identify a maximum interval during which the sequence remains at a relatively constant or stable level (e.g., variations in the sequence do not exceed a threshold value, or any other suitable criteria).

The reset-parameter calculation circuit 308 is configured to determine RNN reset parameters 124, for re-initialization of the RNN during operation, based on the identified maximum stable interval. For example, in some embodiments, the reset time parameter (e.g., chunk length) is set to the duration of the maximum interval, and the reset context duration parameter (e.g., extra left context) is based on the time difference between the reset and the starting point of the maximum interval. The reset parameters 124 may be stored for use by the RNN reset circuit 212 during subsequent operation of the RNN 130.

Figure 4:
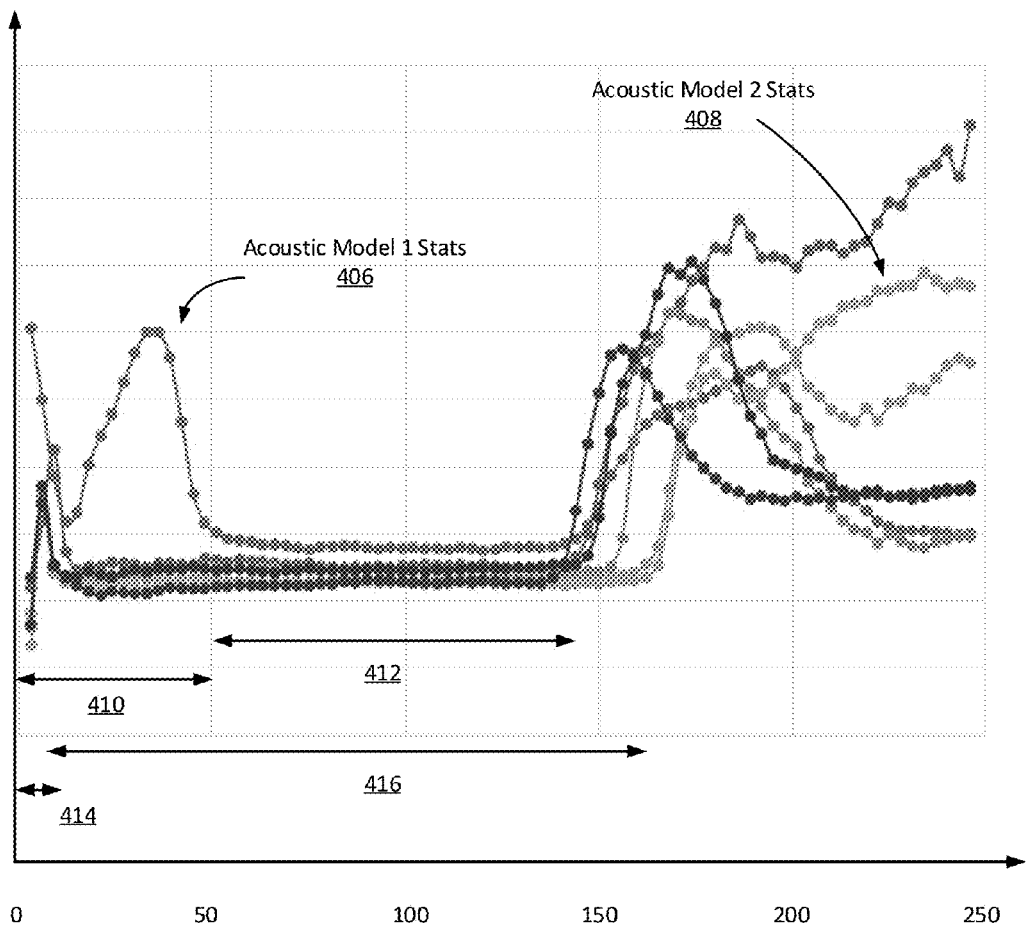
FIG. 4 is a graph illustrating statistical sequences for RNN analysis, in accordance with certain embodiments of the present disclosure.

FIG. 4 is a graph 400 illustrating statistical sequences values 404 for RNN analysis, in accordance with certain embodiments of the present disclosure. Example statistic sequences, as a function of chunk length 402 (expressed as a number of 10 msec audio frames), are shown for a number of different acoustic models 406, 408, etc. Referring to acoustic model 1 statistics 406, as an example, the maximum constant interval 412 is determined to be approximately 95 frames (the region between frame 50 and frame 145). Thus, the reset time parameter would be set to 95 frames or 0.95 seconds. The reset context duration parameter 410 would therefore be set to the time difference between the reset (at time 0) and the starting point of the maximum interval (at frame 50) which is 0.5 seconds.

Similarly, for acoustic model 2 statistics 408, the maximum constant interval 416 is determined to be approximately 147 frames (the region between frame 162 and frame 15). Thus, the reset time parameter would be set to 147 frames or 1.47 seconds. The reset context duration parameter 414 would therefore be set to the time difference between the reset (at time 0) and the starting point of the maximum interval (at frame 15) which is 0.15 seconds. As can be seen from these examples, the reset parameters can vary significantly for different acoustic models, and thus the disclosed techniques can provide improved performance by customizing the reset parameters to the acoustic model.

Methodology

Figure 5:
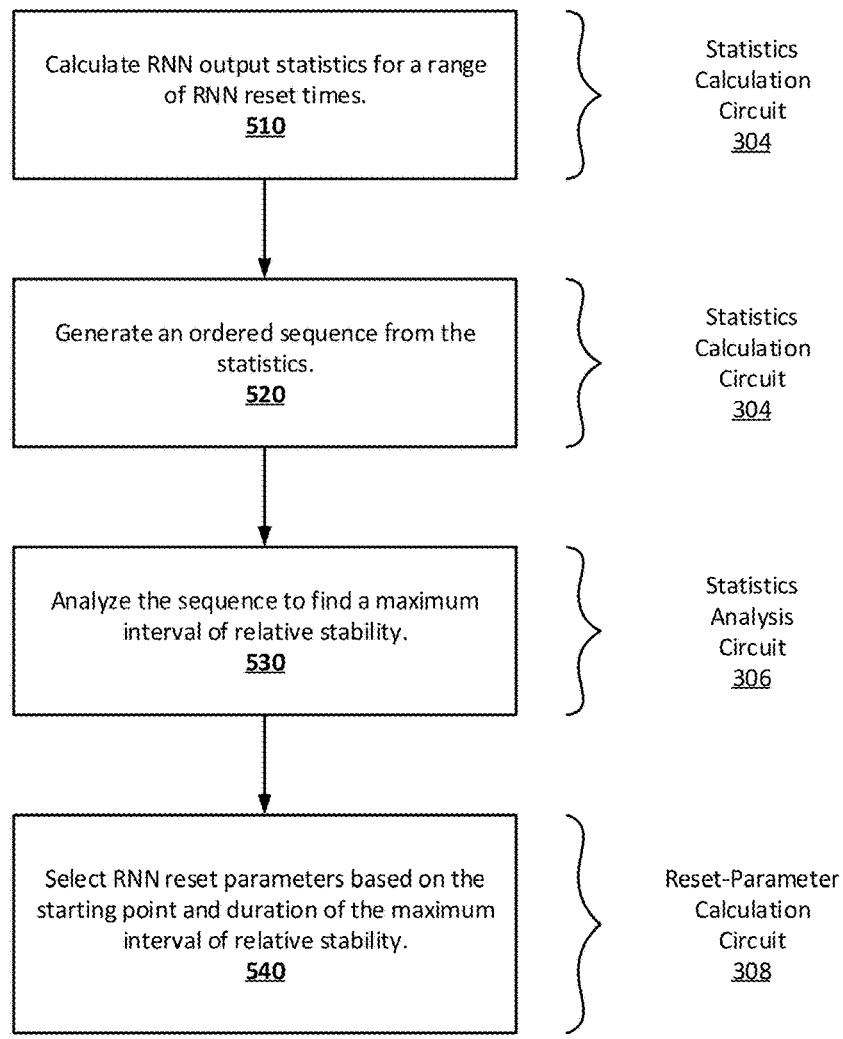
FIG. 5 is a flowchart illustrating a methodology for statistical-analysis-based determination of reset parameters for an RNN, in accordance with certain embodiments of the present disclosure.

FIG. 5 is a flowchart illustrating an example method 500 for statistical-analysis-based determination of reset parameters for an RNN, in accordance with certain embodiments of the present disclosure. The RNN serves as an acoustic model for an automatic speech recognizer (ASR) and is reset or re-initialized periodically to improve stability and performance. As can be seen, the example method includes a number of phases and sub-processes, the sequence of which may vary from one embodiment to another. However, when considered in the aggregate, these phases and sub-processes form a process for reset parameter determination in accordance with certain of the embodiments disclosed herein. These embodiments can be implemented, for example using the system architecture illustrated in FIGS. 1-3 as described above. However other system architectures can be used in other embodiments, as will be apparent in light of this disclosure. To this end, the correlation of the various functions shown in FIG. 5 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 500. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 5, in an embodiment, method 500 for RNN reset parameter determination commences by calculating, at operation 510, a statistic based on outputs of an RNN that is periodically re-initialized after a selected RNN reset time has elapsed. The calculated statistic is associated with the selected RNN reset time. In some embodiments, the statistic is calculated as an average of the standard deviations of each of the outputs of the RNN operating under the selected reset time.

Next, at operation 520, a statistical sequence is generated from a plurality of the calculated statistics that are each associated with a selected RNN reset time. The RNN reset times are selected from a pre-determined range of RNN reset times that are of interest (e.g., may be expected to provide favorable results). In some embodiments, the sequence is ordered such that the statistics correspond to RNN reset times of increasing durations.

At operation 530, the sequence is analyzed to identify a maximum interval during which the sequence remains at a relatively constant or stable level (e.g., variations in the sequence do not exceed a threshold value).

At operation 540, RNN reset parameters, for re-initialization of the RNN during operation, are determined based on the identified maximum stable interval. For example, in some embodiments, the reset time parameter is set to the duration of the maximum interval, and the reset context duration parameter is based on the time difference between the reset and the starting point of the maximum interval.

Of course, in some embodiments, additional operations may be performed, as previously described in connection with the system. For example, the reset parameters may be stored for subsequent use by a reset circuit configured to re-initialize the RNN during operation, to maintain the stability of the RNN. Generally, the disclosed reset parameter determination operations are performed after the RNN has been trained, but before the RNN is put into operation.

Example System

Figure 6:
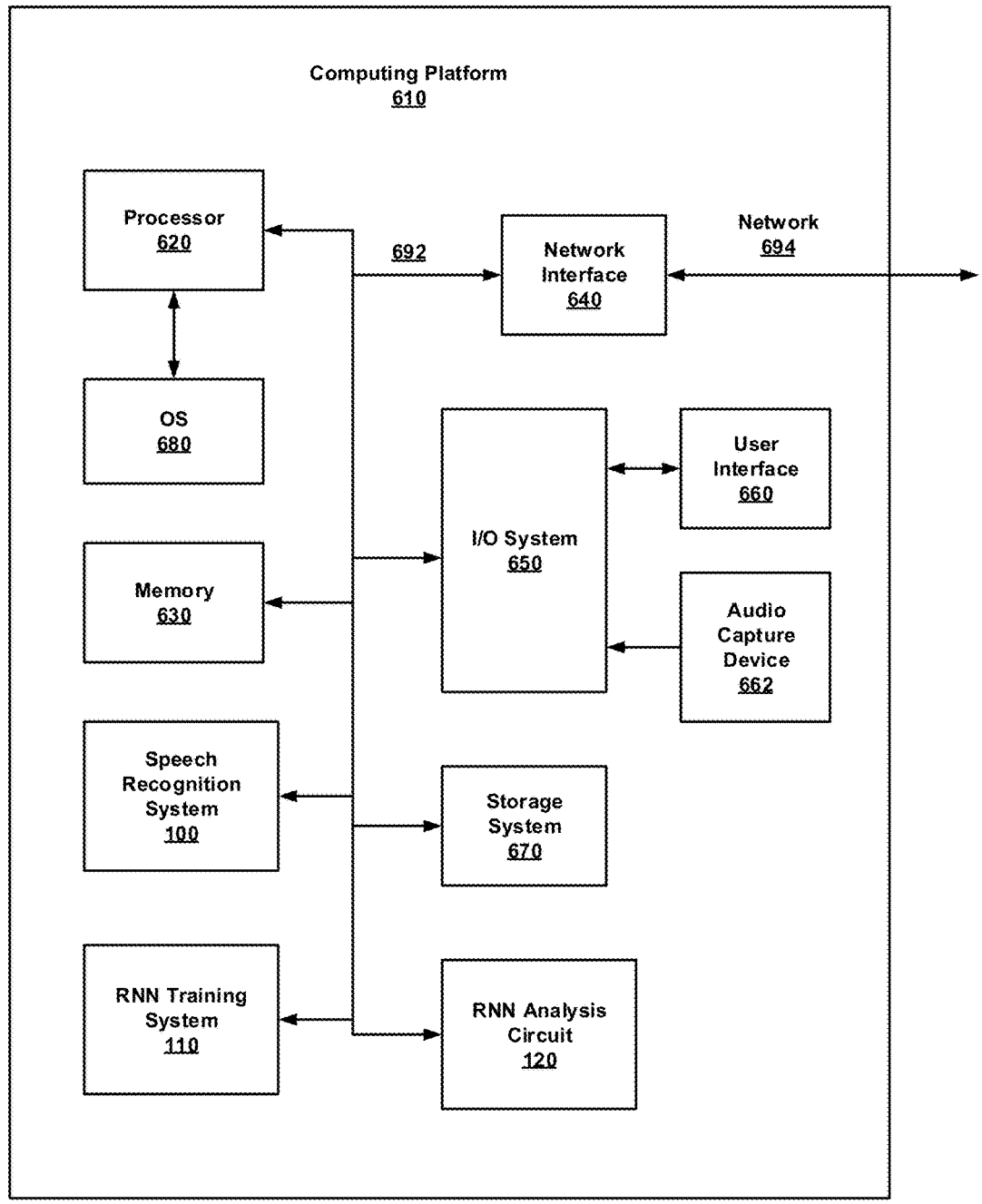
FIG. 6 is a block diagram schematically illustrating a computing platform configured to perform statistical-analysis-based determination of reset parameters for an RNN, in accordance with certain embodiments of the present disclosure.

FIG. 6 illustrates an example system 600 to perform statistical-analysis-based determination of reset parameters for an RNN, configured in accordance with certain embodiments of the present disclosure. In some embodiments, system 600 comprises a computing platform 610 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, and so forth. Any combination of different devices may be used in certain embodiments.

In some embodiments, platform 610 may comprise any combination of a processor 620, a memory 630, speech recognition system 100, RNN training system 110, RNN analysis circuit, 120, a network interface 640, an input/output (I/O) system 650, a user interface 660, an audio capture device 662, and a storage system 670. As can be further seen, a bus and/or interconnect 692 is also provided to allow for communication between the various components listed above and/or other components not shown. Platform 610 can be coupled to a network 694 through network interface 640 to allow for communications with other computing devices, platforms, or resources. In some embodiments, network 694 may include the Internet. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor, a graphics processing unit, or hardware accelerator, to assist in control and processing operations associated with system 600. In some embodiments, the processor 620 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 620 may be implemented as a complex instruction set computer (CISC) or a reduced instruction set computer (RISC) processor. In some embodiments, processor 620 may be configured as an x86 instruction set compatible processor.

Memory 630 can be implemented using any suitable type of digital storage including, for example, flash memory and/or random access memory (RAM). In some embodiments, the memory 630 may include various layers of memory hierarchy and/or memory caches as are known to those of skill in the art. Memory 630 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included.

Processor 620 may be configured to execute an Operating System (OS) 680 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 600, and therefore may also be implemented using any suitable existing or subsequently-developed platform.

Network interface circuit 640 can be any appropriate network chip or chipset which allows for wired and/or wireless connection between other components of computer system 600 and/or network 694, thereby enabling system 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of computer system 600. I/O devices may include, but not be limited to, user interface 660 and audio capture device 662 (e.g., a microphone). User interface 660 may include devices (not shown) such as a display element, touchpad, keyboard, mouse, and speaker, etc. I/O system 650 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 620 or any chipset of platform 610.

It will be appreciated that in some embodiments, the various components of the system 600 may be combined or integrated in a system-on-a-chip (SoC) architecture. In some embodiments, the components may be hardware components, firmware components, software components or any suitable combination of hardware, firmware or software.

RNN analysis circuit 120 is configured to perform a statistical analysis of the outputs of an RNN acoustic model under varying rest times to determine a relatively optimal set of reset parameters, as described previously. RNN analysis circuit 120 may include any or all of the circuits/components illustrated in FIGS. 1-3, as described above. These components can be implemented or otherwise used in conjunction with a variety of suitable software and/or hardware that is coupled to or that otherwise forms a part of platform 610. These components can additionally or alternatively be implemented or otherwise used in conjunction with user I/O devices that are capable of providing information to, and receiving information and commands from, a user.

In some embodiments, these circuits may be installed local to system 600, as shown in the example embodiment of FIG. 6. Alternatively, system 600 can be implemented in a client-server arrangement wherein at least some functionality associated with these circuits is provided to system 600 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 694 or remotely coupled to network 694 by one or more other networks and/or communication channels. In some cases, access to resources on a given network or computing system may require credentials such as usernames, passwords, and/or compliance with any other suitable security mechanism.

In various embodiments, system 600 may be implemented as a wireless system, a wired system, or a combination of both. When implemented as a wireless system, system 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the reset parameter determination methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. In other embodiments, the functionalities disclosed herein can be incorporated into other software applications, such as robotics, gaming, personal assistance and virtual reality applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for calculating recurrent neural network (RNN) reset parameters. The method comprises: calculating, by a processor-based system, a statistic based on outputs of an RNN that is periodically re-initialized at a selected RNN reset time, the calculated statistic associated with the selected RNN reset time; generating, by the processor-based system, a statistical sequence from a plurality of the calculated statistics wherein each of the plurality of calculated statistics is associated with a unique selected RNN reset time selected from a pre-determined range of RNN reset times; analyzing, by the processor-based system, the sequence to identify a maximum interval during which variations of the sequence do not exceed a threshold value; selecting, by the processor-based system, a reset time parameter for re-initialization of the RNN during operation, the reset time parameter based on the identified maximum interval; and selecting, by the processor-based system, a reset context duration parameter for the re-initialization of the RNN during operation, the reset context duration parameter based on a time associated with a starting point of the identified maximum interval.

Example 2 includes the subject matter of Example 1, further comprising: calculating a standard deviation of each of the outputs of the RNN during execution of the RNN after the selected reset time; and averaging the standard deviations associated with each of the outputs to generate the statistic associated with the selected RNN reset time.

Example 3 includes the subject matter of Examples 1 or 2, further comprising ordering the sequence such that the statistics correspond to RNN reset times of increasing durations.

Example 4 includes the subject matter of any of Examples 1-3, wherein the RNN is an acoustic model for an automatic speech recognition system.

Example 5 includes the subject matter of any of Examples 1-4, further comprising storing the reset time parameter and the reset context duration parameter for use by a reset circuit to re-initialize the RNN during operation.

Example 6 includes the subject matter of any of Examples 1-5, wherein the re-initialization of the RNN employs a quantity of training feature vectors based on the reset context duration parameter and is performed at a periodic interval based on the reset time parameter.

Example 7 includes the subject matter of any of Examples 1-6, wherein the re-initialization of the RNN is performed to maintain stability of the RNN.

Example 8 includes the subject matter of any of Examples 1-7, wherein the reset time parameter and the reset context duration parameter are calculated subsequent to training of the RNN and prior to operation of the RNN.

Example 9 is a system for calculating recurrent neural network (RNN) reset parameters. The system comprises: a statistics calculation circuit to calculate a statistic based on outputs of an RNN that is periodically re-initialized at a selected RNN reset time, the calculated statistic associated with the selected RNN reset time, and to generate a statistical sequence from a plurality of the calculated statistics wherein each of the plurality of calculated statistics is associated with a unique selected RNN reset time selected from a pre-determined range of RNN reset times; a statistics analysis circuit to analyze the sequence to identify a maximum interval during which variations of the sequence do not exceed a threshold value; and a reset-parameter calculation circuit to select a reset time parameter for re-initialization of the RNN during operation, the reset time parameter based on the identified maximum interval, and select a reset context duration parameter for the re-initialization of the RNN during operation, the reset context duration parameter based on a time associated with a starting point of the identified maximum interval.

Example 10 includes the subject matter of Example 9, wherein the statistics calculation circuit is further to calculate a standard deviation of each of the outputs of the RNN during execution of the RNN after the selected reset time, and average the standard deviations associated with each of the outputs to generate the statistic associated with the selected RNN reset time.

Example 11 includes the subject matter of Examples 9 or 10, wherein the statistics calculation circuit is further to order the sequence such that the statistics correspond to RNN reset times of increasing durations.

Example 12 includes the subject matter of any of Examples 9-11, wherein the RNN is an acoustic model for an automatic speech recognition system.

Example 13 includes the subject matter of any of Examples 9-12, wherein the reset-parameter calculation circuit is further to store the reset time parameter and the reset context duration parameter for use by a reset circuit to re-initialize the RNN during operation.

Example 14 includes the subject matter of any of Examples 9-13, wherein the re-initialization of the RNN employs a quantity of training feature vectors based on the reset context duration parameter and is performed at a periodic interval based on the reset time parameter.

Example 15 includes the subject matter of any of Examples 9-14, wherein the re-initialization of the RNN is performed to maintain stability of the RNN.

Example 16 includes the subject matter of any of Examples 9-15, wherein the reset-parameter calculation circuit is further to calculate the reset time parameter and the reset context duration parameter subsequent to training of the RNN and prior to operation of the RNN.

Example 17 is that least one non-transitory computer readable storage medium having instructions encoded thereon that, when executed by one or more processors, result in the following operations for calculating recurrent neural network (RNN) reset parameters. The operations comprise: calculating a statistic based on outputs of an RNN that is periodically re-initialized at a selected RNN reset time, the calculated statistic associated with the selected RNN reset time; generating a statistical sequence from a plurality of the calculated statistics wherein each of the plurality of calculated statistics is associated with a unique selected RNN reset time selected from a pre-determined range of RNN reset times; analyzing the sequence to identify a maximum interval during which variations of the sequence do not exceed a threshold value; selecting a reset time parameter for re-initialization of the RNN during operation, the reset time parameter based on the identified maximum interval; and selecting a reset context duration parameter for the re-initialization of the RNN during operation, the reset context duration parameter based on a time associated with a starting point of the identified maximum interval.

Example 18 includes the subject matter of Example 17, further comprising the operations of: calculating a standard deviation of each of the outputs of the RNN during execution of the RNN after the selected reset time; and averaging the standard deviations associated with each of the outputs to generate the statistic associated with the selected RNN reset time.

Example 19 includes the subject matter of Examples 17 or 18, further comprising the operation of ordering the sequence such that the statistics correspond to RNN reset times of increasing durations.

Example 20 includes the subject matter of any of Examples 17-19, wherein the RNN is an acoustic model for an automatic speech recognition system.

Example 21 includes the subject matter of any of Examples 17-20, further comprising the operation of storing the reset time parameter and the reset context duration parameter for use by a reset circuit to re-initialize the RNN during operation.

Example 22 includes the subject matter of any of Examples 17-21, wherein the re-initialization of the RNN employs a quantity of training feature vectors based on the reset context duration parameter and is performed at a periodic interval based on the reset time parameter.

Example 23 includes the subject matter of any of Examples 17-22, wherein the re-initialization of the RNN is performed to maintain stability of the RNN.

Example 24 includes the subject matter of any of Examples 17-23, wherein the reset time parameter and the reset context duration parameter are calculated subsequent to training of the RNN and prior to operation of the RNN.

Example 25 is a system for calculating recurrent neural network (RNN) reset parameters. The system comprises: means for calculating a statistic based on outputs of an RNN that is periodically re-initialized at a selected RNN reset time, the calculated statistic associated with the selected RNN reset time; means for generating a statistical sequence from a plurality of the calculated statistics wherein each of the plurality of calculated statistics is associated with a unique selected RNN reset time selected from a pre-determined range of RNN reset times; means for analyzing the sequence to identify a maximum interval during which variations of the sequence do not exceed a threshold value; means for selecting a reset time parameter for re-initialization of the RNN during operation, the reset time parameter based on the identified maximum interval; and means for selecting a reset context duration parameter for the re-initialization of the RNN during operation, the reset context duration parameter based on a time associated with a starting point of the identified maximum interval.

Example 26 includes the subject matter of Example 25, further comprising: means for calculating a standard deviation of each of the outputs of the RNN during execution of the RNN after the selected reset time; and means for averaging the standard deviations associated with each of the outputs to generate the statistic associated with the selected RNN reset time.

Example 27 includes the subject matter of Examples 25 or 26, further comprising means for ordering the sequence such that the statistics correspond to RNN reset times of increasing durations.

Example 28 includes the subject matter of any of Examples 25-27, wherein the RNN is an acoustic model for an automatic speech recognition system.

Example 29 includes the subject matter of any of Examples 25-28, further comprising means for storing the reset time parameter and the reset context duration parameter for use by a reset circuit to re-initialize the RNN during operation.

Example 30 includes the subject matter of any of Examples 25-29, wherein the re-initialization of the RNN employs a quantity of training feature vectors based on the reset context duration parameter and is performed at a periodic interval based on the reset time parameter.

Example 31 includes the subject matter of any of Examples 25-30, wherein the re-initialization of the RNN is performed to maintain stability of the RNN.

Example 32 includes the subject matter of any of Examples 25-31, wherein the reset time parameter and the reset context duration parameter are calculated subsequent to training of the RNN and prior to operation of the RNN.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for calculating recurrent neural network (RNN) reset parameters, the method comprising:
calculating, by a processor-based system, a statistic based on outputs of an RNN that is periodically re-initialized at a selected RNN reset time, the calculated statistic associated with the selected RNN reset time;
generating, by the processor-based system, a statistical sequence from a plurality of the calculated statistics wherein each of the plurality of calculated statistics is associated with a unique selected RNN reset time selected from a pre-determined range of RNN reset times;
analyzing, by the processor-based system, the sequence to identify a maximum interval during which variations of the sequence do not exceed a threshold value;

selecting, by the processor-based system, a reset time parameter for re-initialization of the RNN during operation, the reset time parameter based on the identified maximum interval;

selecting, by the processor-based system, a reset context duration parameter for the re-initialization of the RNN during operation, the reset context duration parameter based on a time associated with a starting point of the identified maximum interval; and storing, by the processor-based system, the reset time parameter and the reset context duration parameter for use by a reset circuit to re-initialize the RNN during operation;

wherein the RNN is an acoustic model for an automatic speech recognition system.

2. The method of claim 1, further comprising:
calculating a standard deviation of each of the outputs of the RNN during execution of the RNN after the selected reset time; and
averaging the standard deviations associated with each of the outputs to generate the statistic associated with the selected RNN reset time.

3. The method of claim 1, further comprising ordering the sequence such that the statistics correspond to RNN reset times of increasing durations.

4. The method of claim 1, wherein the reset time parameter and reset context duration parameter are optimized relative to general pre-defined values.

5. The method of claim 1, wherein the RNN implements a long short-term memory (LSTM) architecture.

6. The method of claim 1, wherein the re-initialization of the RNN employs a quantity of training feature vectors based on the reset context duration parameter and is performed at a periodic interval based on the reset time parameter.

7. The method of claim 1, wherein the re-initialization of the RNN is performed to maintain stability of the RNN.

8. The method of claim 1, wherein the reset time parameter and the reset context duration parameter are calculated subsequent to training of the RNN and prior to operation of the RNN.

9. A system for calculating recurrent neural network (RNN) reset parameters, the system comprising:
a statistics calculation circuit to calculate a statistic based on outputs of an RNN that is periodically re-initialized at a selected RNN reset time, the calculated statistic associated with the selected RNN reset time, and to generate a statistical sequence from a plurality of the calculated statistics wherein each of the plurality of calculated statistics is associated with a unique selected RNN reset time selected from a pre-determined range of RNN reset times;
a statistics analysis circuit to analyze the sequence to identify a maximum interval during which variations of the sequence do not exceed a threshold value; and
a reset-parameter calculation circuit to select a reset time parameter for re-initialization of the RNN during operation, the reset time parameter based on the identified maximum interval, select a reset context duration parameter for the re-initialization of the RNN during operation, the reset context duration parameter based on a time associated with a starting point of the identified maximum interval, and store the reset time parameter and the reset context duration parameter for use by a reset circuit to re-initialize the RNN during operation;

wherein the RNN is an acoustic model for an automatic speech recognition system.

10. The system of claim 9, wherein the statistics calculation circuit is further to calculate a standard deviation of each of the outputs of the RNN during execution of the RNN after the selected reset time, and average the standard deviations associated with each of the outputs to generate the statistic associated with the selected RNN reset time.

11. The system of claim 9, wherein the statistics calculation circuit is further to order the sequence such that the statistics correspond to RNN reset times of increasing durations.

12. The system of claim 9, wherein the reset time parameter and reset context duration parameter are optimized relative to general pre-defined values.

13. The system of claim 9, wherein the RNN implements a long short-term memory (LSTM) architecture.

14. The system of claim 9, wherein the re-initialization of the RNN employs a quantity of training feature vectors based on the reset context duration parameter and is performed at a periodic interval based on the reset time parameter.

15. The system of claim 9, wherein the re-initialization of the RNN is performed to maintain stability of the RNN.

16. The system of claim 9, wherein the reset-parameter calculation circuit is further to calculate the reset time parameter and the reset context duration parameter subsequent to training of the RNN and prior to operation of the RNN.

17. At least one non-transitory computer readable storage medium having instructions encoded thereon that, when executed by one or more processors, result in the following operations for calculating recurrent neural network (RNN) reset parameters, the operations comprising:
calculating a statistic based on outputs of an RNN that is periodically re-initialized at a selected RNN reset time, the calculated statistic associated with the selected RNN reset time;
generating a statistical sequence from a plurality of the calculated statistics wherein each of the plurality of calculated statistics is associated with a unique selected RNN reset time selected from a pre-determined range of RNN reset times;
analyzing the sequence to identify a maximum interval during which variations of the sequence do not exceed a threshold value;
selecting a reset time parameter for re-initialization of the RNN during operation, the reset time parameter based on the identified maximum interval;
selecting a reset context duration parameter for the re-initialization of the RNN during operation, the reset context duration parameter based on a time associated with a starting point of the identified maximum interval; and
storing the reset time parameter and the reset context duration parameter for use by a reset circuit to re-initialize the RNN during operation;
wherein the RNN is an acoustic model for an automatic speech recognition system.

18. The computer readable storage medium of claim 17, further comprising the operations of:
calculating a standard deviation of each of the outputs of the RNN during execution of the RNN after the selected reset time; and
averaging the standard deviations associated with each of the outputs to generate the statistic associated with the selected RNN reset time.

19. The computer readable storage medium of claim 17, further comprising the operation of ordering the sequence such that the statistics correspond to RNN reset times of increasing durations.

20. The computer readable storage medium of claim 17, wherein the reset time parameter and reset context duration parameter are optimized relative to general pre-defined values.

21. The computer readable storage medium of claim 17, wherein the RNN implements a long short-term memory (LSTM) architecture.

22. The computer readable storage medium of claim 17, wherein the re-initialization of the RNN employs a quantity of training feature vectors based on the reset context duration parameter and is performed at a periodic interval based on the reset time parameter.

23. The computer readable storage medium of claim 17, wherein the re-initialization of the RNN is performed to maintain stability of the RNN.

24. The computer readable storage medium of claim 17, wherein the reset time parameter and the reset context duration parameter are calculated subsequent to training of the RNN and prior to operation of the RNN.

* * * * *